United States Patent
Krishnamoorthy et al.

(10) Patent No.: US 12,013,160 B2
(45) Date of Patent: Jun. 18, 2024

(54) EXPANSION VALVE PERFORMANCE MONITORING IN REFRIGERATION SYSTEM

(71) Applicant: Hill Phoenix, Inc., Conyers, GA (US)

(72) Inventors: Naresh Kumar Krishnamoorthy, Kerala (IN); Shobin Balakrishnan, Bengaluru (IN)

(73) Assignee: Hill Phoenix, Inc., Conyers, GA (US)

( * ) Notice: Subject to any disclaimer, the term of this patent is extended or adjusted under 35 U.S.C. 154(b) by 0 days.

(21) Appl. No.: 17/994,484

(22) Filed: Nov. 28, 2022

(65) Prior Publication Data
US 2023/0160615 A1 May 25, 2023

Related U.S. Application Data

(63) Continuation of application No. 16/868,730, filed on May 7, 2020, now Pat. No. 11,512,884.

(51) Int. Cl.
*F25B 49/00* (2006.01)
*F25B 40/06* (2006.01)
(Continued)

(52) U.S. Cl.
CPC ............ *F25B 49/005* (2013.01); *F25B 40/06* (2013.01); *F25B 41/31* (2021.01); *G01M 13/003* (2019.01); *F25B 2341/064* (2013.01); *F25B 2341/068* (2013.01); *F25B 2600/2513* (2013.01); *F25B 2700/15* (2013.01)

(58) Field of Classification Search
CPC ........ F25B 49/005; F25B 40/06; F25B 41/31; F25B 2341/064; F25B 2341/068; F25B 2600/2513; F25B 2700/15; F25B 2700/191; F25B 2700/197; F25B 2700/21151; F25B 2700/21174; F25B 2700/21175
See application file for complete search history.

(56) References Cited

U.S. PATENT DOCUMENTS

| 4,527,399 A | 7/1985 | Lord |
| 11,512,884 B2 | 11/2022 | Krishnamoorthy et al. |

(Continued)

FOREIGN PATENT DOCUMENTS

| EP | 2998667 | 3/2016 |
| JP | 03125860 | 5/1991 |
| JP | 2004293870 A | * 10/2004 |

*Primary Examiner* — Kun Kai Ma
(74) *Attorney, Agent, or Firm* — Fish & Richardson P.C.

(57) ABSTRACT

A method of detecting electrical failure in a refrigeration system is provided. The method includes determining whether a present superheat of the refrigeration system is between a maximum superheat and a minimum superheat for the refrigeration system, the maximum superheat and the minimum superheat defining a normal operating range. The method also includes detecting an electrical property of an expansion valve assembly of the refrigeration system responsive to the superheat being outside the normal operating range. The method further includes determining whether the expansion valve assembly as experienced an electrical failure based on at least the electrical property. A signal indicating that the expansion valve has experienced an electrical failure is generated based on a determination that the expansion valve assembly has experienced the electrical failure.

22 Claims, 9 Drawing Sheets

(51) Int. Cl.
*F25B 41/31* (2021.01)
*G01M 13/003* (2019.01)

(56) References Cited

U.S. PATENT DOCUMENTS

| | | |
|---|---|---|
| 2009/0031740 A1 | 2/2009 | Douglas |
| 2016/0159198 A1 | 6/2016 | Tang et al. |
| 2016/0200176 A1* | 7/2016 | Stanke ................ B60H 1/3211 62/126 |
| 2018/0209703 A1 | 7/2018 | Hern et al. |
| 2021/0101445 A1 | 4/2021 | Blatchley et al. |
| 2021/0348818 A1 | 11/2021 | Krishnamoorthy et al. |

* cited by examiner

EXPANSION VALVE PERFORMANCE MONITORING IN REFRIGERATION SYSTEM

CROSS-REFERENCE TO RELATED APPLICATIONS

This application is a continuation application of and claims the benefit of priority to U.S. application Ser. No. 16/868,730, filed on May 7, 2020, the contents of which is hereby incorporated by reference.

BACKGROUND

The present disclosure relates generally to the field of refrigeration systems, including for refrigerated display cases. More specifically, the present disclosure relates to the field of controllers and diagnostic systems for refrigeration systems.

SUMMARY

At least one embodiment of the present disclosure relates a method of detecting electrical failure in a refrigeration system. The method includes determining whether a present superheat of the refrigeration system is between a maximum superheat and a minimum superheat for the refrigeration system. The maximum superheat and the minimum superheat define a normal operating range. The method also includes detecting an electrical property of an expansion valve assembly of the refrigeration system in response to the superheat of the refrigeration system being outside of the normal operating range, determining whether the expansion valve assembly has experienced an electrical failure based on at least the electrical property of the expansion valve assembly, and generating a first signal indicating that the expansion valve assembly has experienced the electrical failure in response to a determination that the expansion valve assembly has experienced the electrical failure.

Another embodiment of the present disclosure relates to a system (e.g., a refrigeration system). The system includes a housing defining a temperature controlled space and a thermal exchange system, coupled to the housing. The thermal exchange system is configured to selectively control a temperature of the temperature controlled space. The thermal exchange system includes an actuator and a controller. The controller is configured to determine whether a present superheat of the refrigeration system is between a maximum superheat and a minimum superheat for the refrigeration system. The maximum superheat and the minimum superheat define a normal operating range. The controller is also configured to detect an electrical property of an expansion valve assembly of the refrigeration system in response to the superheat of the refrigeration system being outside of the normal operating range, determine whether the expansion valve assembly has experienced an electrical failure based on at least the electrical property of the expansion valve assembly, and generate a first signal indicating that the expansion valve assembly has experienced the electrical failure in response to a determination that the expansion valve assembly has experienced the electrical failure.

Another embodiment of the present disclosure relates to a controller for diagnosing a refrigeration system. The controller configured to determine a present superheat of the refrigeration system and a maximum superheat and a minimum superheat for the refrigeration system. The maximum superheat and the minimum superheat define a normal operating range. The controller is also configured to detect, an electrical property of an expansion valve assembly of the refrigeration system responsive to the present superheat of the refrigeration system being outside of the normal operating range, determine whether the expansion valve assembly has experienced an electrical failure based on at least the electrical property of the expansion valve assembly, and generate a first signal indicating that the expansion valve assembly has experienced the electrical failure responsive to a determination that the expansion valve assembly has experienced the electrical failure.

DETAILED DESCRIPTION

Referring generally to the FIGURES, a refrigeration system and components thereof are shown, according to various exemplary embodiments. The refrigeration system may be a vapor compression refrigeration system. In some implementations, the refrigeration system may be used to provide cooling for temperature-controlled display devices in a supermarket or other similar facility.

In some embodiments, the refrigeration system includes a receiving tank (e.g., a flash tank, a refrigerant reservoir, etc.) containing refrigerant, a condenser assembly, a compressor assembly, an accumulator, a subcooler assembly, and a superheater assembly. The refrigeration system includes a controller for monitoring and controlling the pressure, temperature, and/or flow of the refrigerant throughout the refrigeration system. The controller can operate each of the assemblies (e.g., according to the various control processes described herein) to efficiently regulate the pressure of the refrigerant within the receiving tank. Additionally, the controller can interface with other instrumentation associated with the refrigeration system (e.g., measurement devices, timing devices, pressure sensors, temperature sensors, etc.) and provide appropriate control signals to a variety of operable components of the refrigeration system (e.g., compressors, valves, power supplies, flow diverters, etc.) to regulate the pressure, temperature, and/or flow at other locations within the refrigeration system. Advantageously, the controller may be used to facilitate efficient operation of the refrigeration system, reduce energy consumption, improve system performance, and diagnose problems within the system.

Before discussing further details of the refrigeration system and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, transmission of forces, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
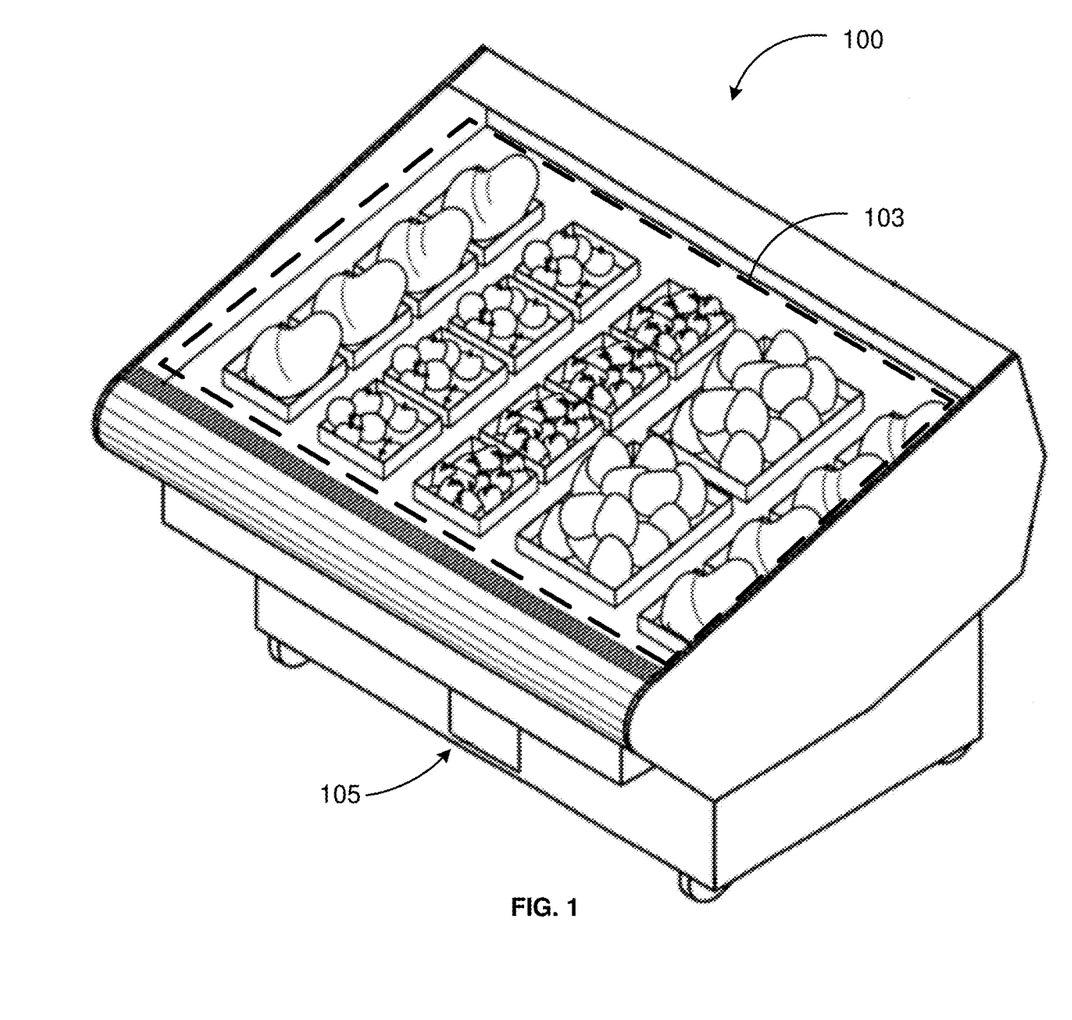
FIG. 1 is a perspective view of a refrigerated display case according to an exemplary embodiment.

Referring now to FIG. 1, a perspective view of a refrigerated display case 100 is shown, according to an exemplary embodiment. The refrigerated display case 100 includes a refrigeration body 101 which defines a temperature controlled space 103. The refrigerated display case 100 may include a mechanical-compression refrigeration system, an absorption refrigerating system, an evaporative cooling system, or a thermoelectric refrigeration system configured to selectively control a temperature of the temperature controlled space 103. In some embodiments, the refrigerated display case 100 may be a standalone unit. In other embodiments, the refrigerated display case 100 may be part of a larger refrigeration system.

Figure 2:
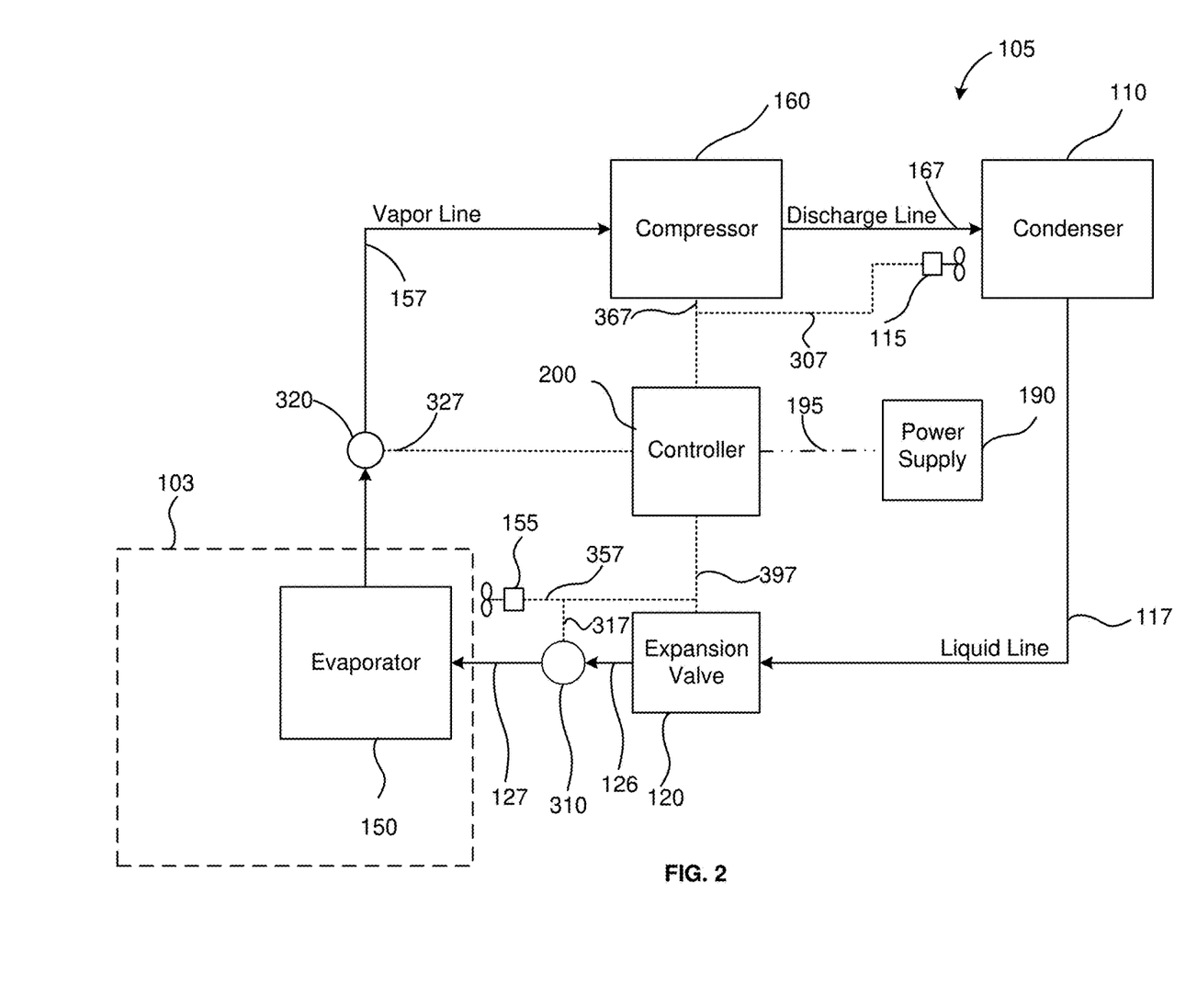
FIG. 2 is a block diagram of a refrigeration system and associated components, according to an exemplary embodiment.

Referring now to FIG. 2, a block diagram of a refrigeration system 105 is shown, according to an exemplary embodiment. The refrigeration system 105 is coupled to and configured to selectively control the temperature of the temperature controlled space 103. The refrigeration system 105 includes a refrigerant disposed therein. The refrigerant is configured to facilitate thermal energy exchange throughout the refrigeration system 105. The refrigeration system 105 also includes a condenser assembly 110 configured to facilitate thermal energy loss from the refrigerant. The condenser assembly 110 includes a fan 115 configured to assist in the thermal energy loss. The condenser assembly 110 is fluidly coupled to an expansion valve assembly 120 by liquid line 117.

The expansion valve assembly 120 is configured to facilitate a pressure drop in the refrigerant. During the pressure drop, the refrigerant changes phase from a liquid to a vapor. The expansion valve assembly 120 is fluidly coupled to an evaporator assembly (e.g., a coil, etc.) 150 by fluid line 127. Fluid line 127 includes an inlet sensor 310. The inlet sensor 310 is configured to measure the temperature or the pressure of the refrigerant. In other embodiments, the inlet sensor 310 is part of the expansion valve assembly.

The evaporator assembly 150 is coupled to the temperature controlled space 103. The evaporator assembly 150 is configured to facilitate thermal energy gain in the refrigerant. The evaporator assembly 150 includes a fan 155 configured to assist in the thermal energy gain. The evaporator assembly 150 is fluidly coupled to a compressor assembly 160 by vapor line 157. Vapor line 157 includes outlet sensor 320. The outlet sensor 320 is configured to measure the temperature or the pressure of the refrigerant. The compressor assembly 160 is configured to increase the pressure of the refrigerant. The compressor assembly is fluidly coupled to the condenser assembly 110 by a discharge line 167.

The refrigeration system 105 also includes a power supply 190 and a controller 200. The controller 200 is configured to send and receive control signals to each of the components of the refrigeration system 105. As shown the controller is coupled to (1) the fan 115 by control line (e.g., conductive path, wire, cable, etc.) 307, (2) the inlet sensor 310 by control line 317, (3) the outlet sensor 320 by control line 327, (4) the fan 155 by control line 357, (4) the compressor assembly 160 by control line 367, and (5) the expansion valve assembly 120 by control line 397. In additional exemplary embodiments, the controller 200 may be coupled to each of the components of the refrigeration system 105 such that the controller can send and receive signals from each of the components of the refrigeration system 105. Furthermore, the control lines may be configured to facilitate the exchange of data, signals (e.g., analog or digital), power, etc.

In some embodiments, the controller is also configured to facilitate power delivery to each of the components of the refrigeration system 105. In the embedment shown in FIG. 2, the power supply 190 is directly electrically coupled to the controller by power line 195 and indirectly coupled to each of the other components of the refrigeration system 105 via the controller. In a different embodiment, the power supply 190 may be directly electrically coupled to each of the components of the refrigeration system 105. In this embedment, the controller may control the power supply 190 to selectively provide power to each of the components of the refrigeration system 105.

In other exemplary embodiments, the refrigeration system 105 may be configured as a thermal exchange system (e.g., refrigeration system, air conditioning system, heat pump, etc.) configured to facilitate thermal energy exchange. In these embodiments, the system may include the same or similar components, assemblies, and control logic as the refrigeration system 105.

Figure 3:
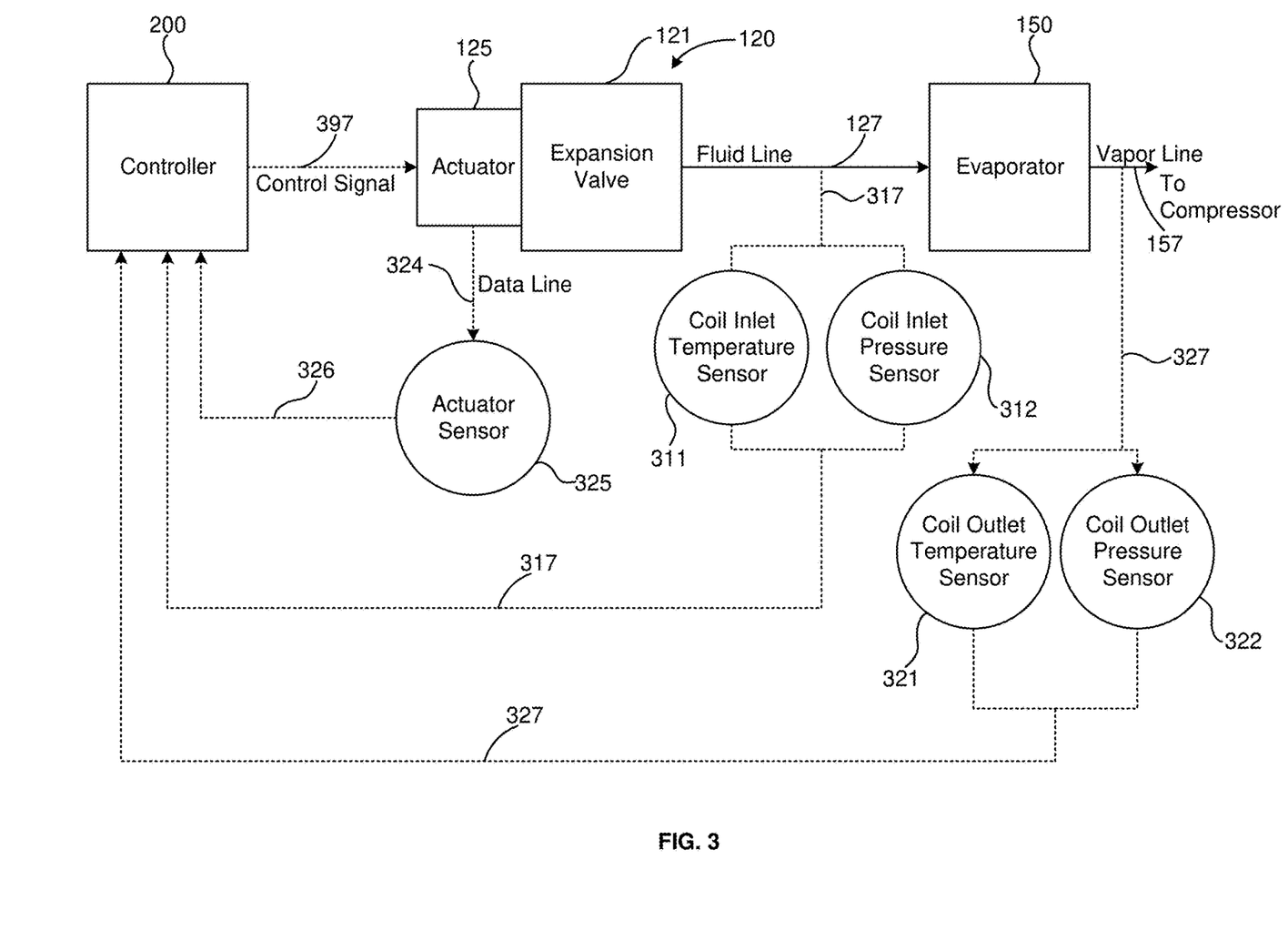
FIG. 3 is a detailed block diagram of the refrigeration system of FIG. 2, according to an exemplary embodiment.

Now referring to FIG. 3, a detailed view of the block diagram of FIG. 2 is shown, according to an exemplary embodiment. The controller 200 is shown as coupled to the expansion valve assembly 120 by control line 397. The expansion valve assembly 120 is shown as including an expansion valve 121 and an actuator 125 (e.g., pneumatic actuator, hydraulic actuator, D/C motor, A/C motor, etc.). The actuator 125 is configured to receive a control signal from controller 200 via the control line 397 and actuate the expansion valve 121.

In some embodiments, the actuator 125 may be configured as a D/C motor. More specifically, the actuator 125 may be configured as a stepper motor. In this configuration, the actuator 125 selectively actuates the expansion valve 121 in a plurality of positions. A first position may be a fully open position. A second position may be a fully closed position. Other positions may be disposed between the first position and the second position.

An actuator sensor 325 is coupled to the actuator 125 by control line 324, as shown. The actuator sensor 325 is configured to continually collect data about the actuator 125. The actuator sensor 325 is further configured to send the collected data to the controller by control line 326.

In other embodiments, the actuator sensor 325 may be integrated with the actuator 125 such that the actuator sensor 325 and the actuator 125 are a single unit. Additionally, the control line 324 and control line 326 may be integrated with control line 397. In one exemplary embodiment, the actuator sensor 325 may be configured to detect an electrical event at (e.g., within, along a path entering or exiting) the expansion valve assembly 120. For example, the sensor may be configured to detect a voltage, a current, a power, or other electrical property (e.g., voltage spike, current spike, power spike, etc.) of the expansion valve assembly 120. In another exemplary embodiment, the actuator sensor 325 is configured as an encoder configured to measure the displacement of the actuator 125.

The expansion valve assembly 120 is fluidly coupled to the evaporator assembly 150 by fluid line 127. The fluid line 127 includes an inlet sensor 310 (see FIG. 2). The inlet sensor 310 includes an inlet temperature sensor 311 and an inlet pressure sensor 312 as shown in FIG. 3. The inlet temperature sensor 311 and the inlet pressure sensor 312 are coupled to the fluid line 127 by control line 317. The inlet temperature sensor 311 is configured to continuously collect data about the temperature of the refrigerant at the fluid line 127 and send the data to the controller 200. The inlet pressure sensor 312 is configured to continuously collect data about the pressure of the refrigerant at the fluid line 127 and send the data to the controller 200 by control line 317. In other embodiments, the inlet temperature sensor 311 and the inlet pressure sensor 312 are integrated into the expansion valve assembly 120. In a different embodiment, the inlet temperature sensor 311 and the inlet pressure sensor 312 are coupled directly to the fluid line 127.

The evaporator assembly 150 is fluidly coupled to the compressor assembly 160 (see FIG. 2) by vapor line 157. The vapor line 157 includes an outlet sensor 320 (see FIG. 2). The outlet sensor 320 includes an outlet temperature sensor 321 and an outlet pressure sensor 322 as shown in FIG. 3. The outlet temperature sensor 321 and the inlet pressure sensor 312 are coupled to the vapor line 157 by control line 327. The outlet temperature sensor 321 is configured to continuously collect data about the temperature of the refrigerant at the vapor line 157 and send the data to the controller 200. The outlet pressure sensor 322 is configured to continuously collect data about the pressure of the refrigerant at the vapor line 157 and send the data to the controller 200 by control line 327. In a different embodiment, the inlet temperature sensor 311 and the inlet pressure sensor 312 are coupled directly to the vapor line 157.

The controller 200 is configured to receive data from the actuator sensor 325, the inlet temperature sensor 311, the inlet pressure sensor 312, the outlet temperature sensor 321, and the outlet pressure sensor 322. The controller 200 is further configured to send a control signal to the actuator 125 based on the data received from the actuator sensor 325, the inlet temperature sensor 311, the inlet pressure sensor 312, the outlet temperature sensor 321, and the outlet pressure sensor 322.

Figure 4:
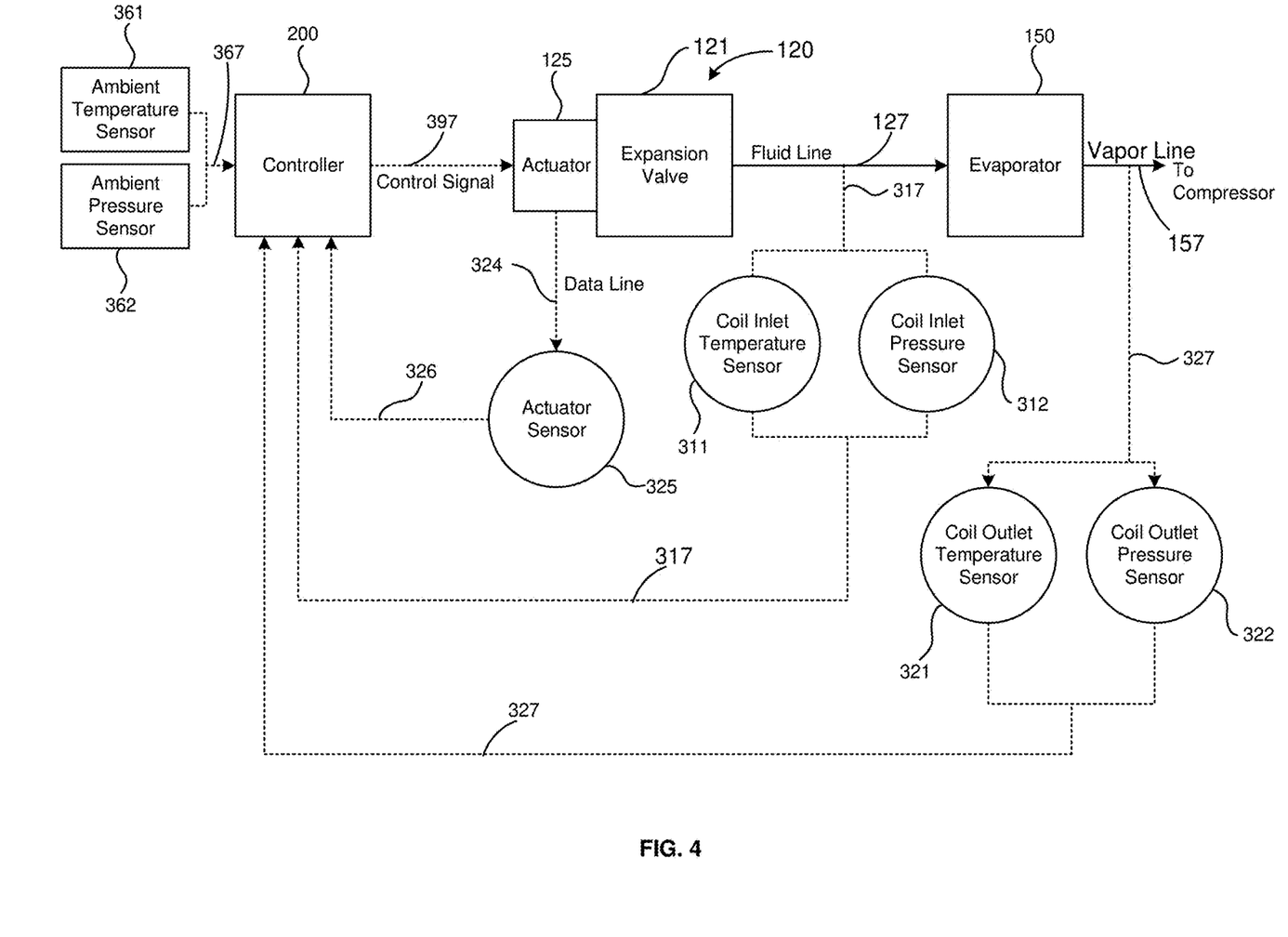
FIG. 4 is a detailed block diagram of the refrigeration system of FIG. 2, according to an exemplary embodiment.

Now referring to FIG. 4, a block diagram of another exemplary embodiment of the refrigeration system 105 of FIG. 2 is shown. The embodiment shown in FIG. 4 includes an ambient temperature sensor 361 and an ambient pressure sensor 362 coupled to the controller 200 by control line 367. Ambient temperature sensor 361 is configured to measure ambient temperature (i.e. the temperature outside of the temperature controlled space 103 or the refrigerated display case 100). Ambient pressure sensor 362 is configured to measure ambient pressure (i.e. the pressure outside of the temperature controlled space 103 or the refrigerated display case 100).

In additional exemplary embodiments, the refrigeration system 105 may only include some of the temperature sensors or the pressure sensors shown in the embodiments of FIGS. 2-4. For example, the refrigeration system 105 may only include pressure sensors. Alternatively, the refrigeration system 105 may include any combination of temperature and pressure sensors. In these embodiments, the controller may be configured to determine a temperature based on the type of refrigerant and the pressure measured from a pressure sensor. Alternatively, the controller may be configured to determine a pressure based on the type of refrigerant and the temperature measured from a temperature sensor. Various combinations of sensors are within the scope of the present disclosure.

Figure 5:
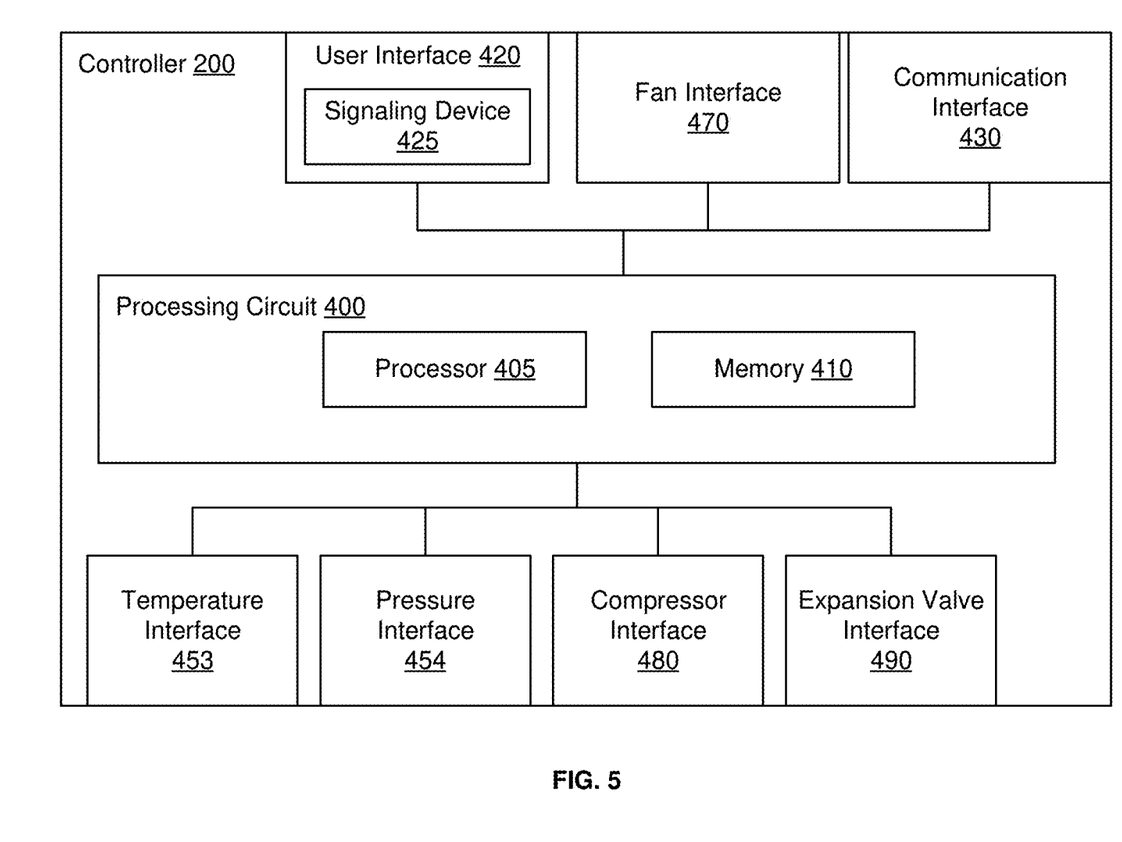
FIG. 5 is a block diagram of a controller for the refrigeration system of FIG. 2 and associated components, according to an exemplary embodiment.

Now referring to FIG. 5, a block diagram of the controller 200 is shown, according to an exemplary embodiment. The controller 200 includes a processing circuit 400. The processing circuit 400 includes a processor 405 and a memory device 410. The processing circuit is communicably coupled (e.g., conductively linked) to various interfaces on the controller 200. The processing circuit is configured to receive and transmit data from the interfaces on the controller 200.

The controller 200 is shown as including a user interface 420. The user interface 420 includes a signaling device 425. The user interface 420 is configured to receive or provide signals from/to a control panel provided with the display case. The control panel may include digital or analog input/output devices for example a display (e.g., LCD, OLED, etc.), an audio device (e.g., speaker, etc.), or an indication device (e.g., LED, etc.) configured to present the data to the user. For example the user interface 420 may be configured to receive data from a user input such as ambient pressure, ambient temperature, desired superheat or subcooling conditions, or other parameters relevant to the operation of the refrigeration system 105 (see FIG. 2). Additionally, the user interface 420 may be configured to provide information to the user such as data collected by various sensors of the refrigeration system 105. The user interface 420 includes a signaling device 425 configured to provide a signal to the control panel. For example, the signaling device 425 may be configured to present operational data about the refrigeration system 105. The signaling device 425 may be configured to notify the user that the refrigeration system 105 is operating within the specified parameters, or that the refrigeration system 105 has experienced a failure to one or more components. For example, the signaling device 425 may light up an LED indication light if certain conditions are meet. More specifically, the signaling device 425 may light up a green LED to indicate that the refrigeration system 105 is operating within the desired parameters set by the user, or the signaling device 425 may light up a red LED to indicate a problem within the refrigeration system 105. In other embodiments, the signaling device 425 may be positioned on the controller 200 and configured to provide an indication of a problem within the refrigeration system 105. For example the signaling device 425 may be a buzzer or alarm integrated with the controller 200 and configured to provide an audible signal indicating a problem within the refrigeration system 105.

The controller 200 also includes a communication interface 430. The communication interface 430 may be configured to send and receive data over a wired connection (e.g., Ethernet, thunderbolt, etc.) or a wireless connection (e.g., Wi-Fi, Bluetooth, etc.). The communication interface 430 may also be configured to interface with the user interface 420 such that the user interface 420 may send and receive data via the communication interface 430 (e.g., to a mobile device).

The controller 200 also includes a temperature interface 453 and a pressure interface 454. The temperature interface 453 is configured to be communicably coupled to temperature sensors (e.g., inlet temperature sensor 311 of FIG. 3) by a control line (e.g., control line 317 of FIG. 3). The pressure interface 454 is configured to be communicably coupled to pressure sensors (e.g., inlet pressure sensor 312 of FIG. 3) by a control line (e.g., control line 327 of FIG. 3). The temperature interface 453 and the pressure interface 454 are each further configured facilitate communication between the sensors and the processing circuit 400.

The controller 200 also includes a compressor interface 480 and an expansion valve interface 490. The compressor interface 480 is configured to facilitate communication between the compressor assembly 160 of FIG. 2 and the processing circuit 400 such that the processing circuit 400 may selectively facilitate the operation of the compressor assembly 160. The expansion valve interface 490 is configured to facilitate communication between the actuator sensor 325 of FIG. 3 and the processing circuit 400 by control line 326 of FIG. 3. Additionally the expansion valve interface 490 may be configured to facilitate communication between the actuator 125 of FIG. 3 and the processing circuit 400 such that the processing circuit 400 may selectively facilitate the operation of the actuator 125 by control line 397 of FIG. 3.

Figure 6:
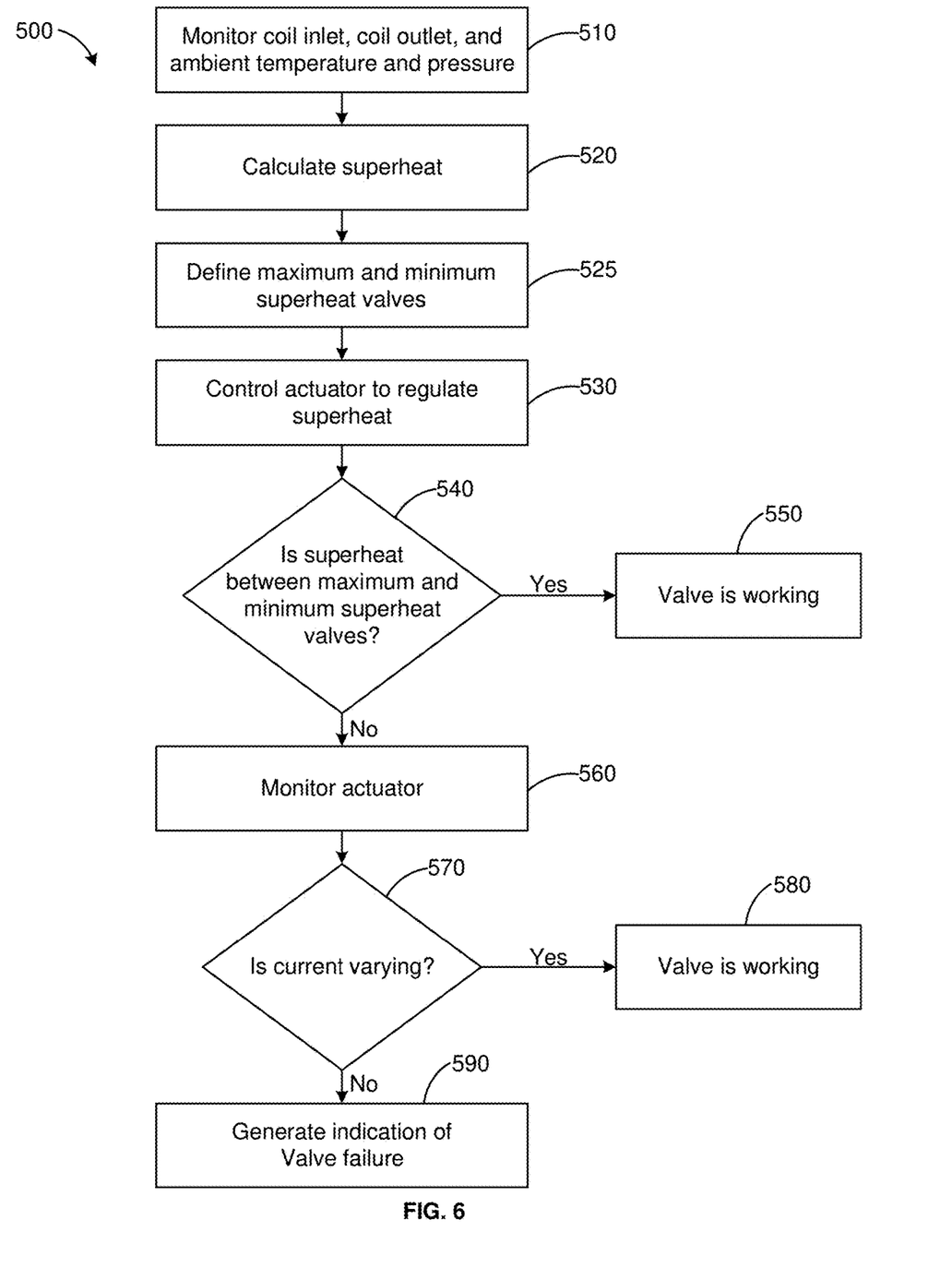
FIG. 6 is a flowchart of a process for monitoring and diagnosing an expansion valve of the refrigeration system of FIG. 2, according to an exemplary embodiment.
Figure 7:
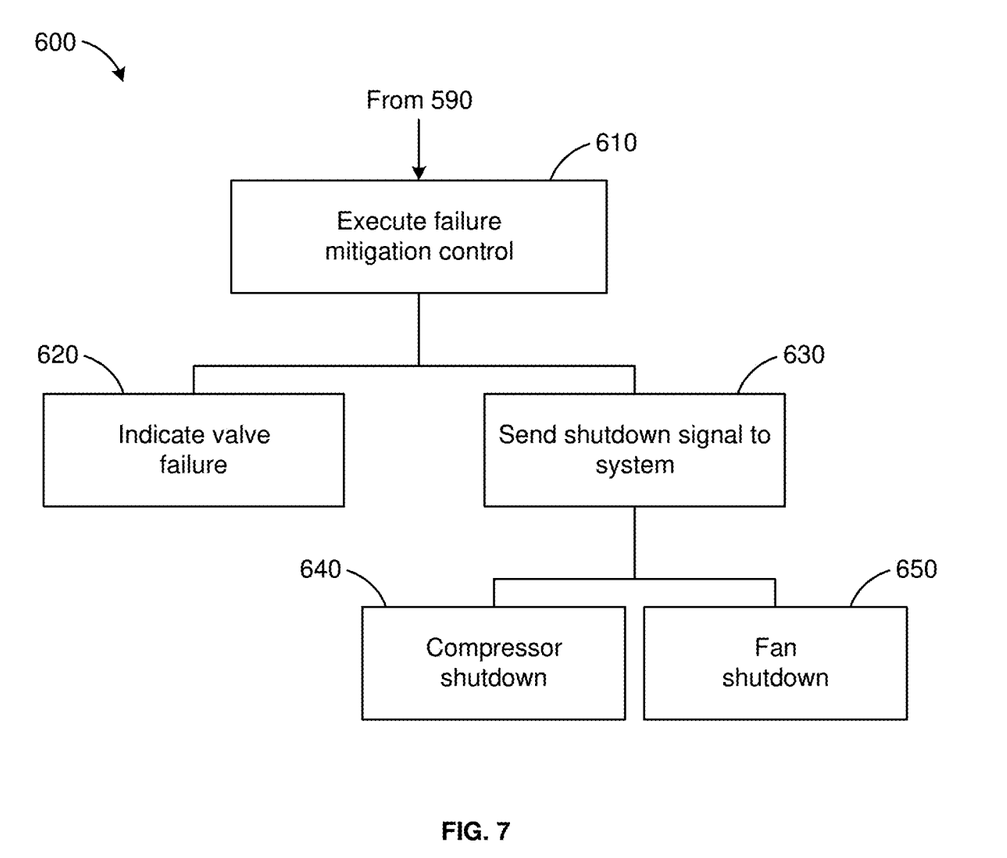
FIG. 7 is a flowchart of a process for failure mitigation controls of the refrigeration system of FIG. 2, according to an exemplary embodiment.

The controller 200 is configured to execute the processes of FIGS. 6-7. The controller 200 is configured to determine if a component of the refrigeration system 105 (e.g., the actuator 125) has experienced an electrical failure. For example, the controller 200 may communicate with the inlet temperature sensor 311, outlet temperature sensor 321, ambient temperature sensor 361, inlet pressure sensor 312, outlet pressure sensor 322, and ambient pressure sensor 362 by the respective control lines (e.g., control line 317, control line 327, and control line 367) to receive the temperature and pressure of the refrigerant at the inlet and the outlet of the evaporator assembly 150 and the ambient temperature and pressure. The controller 200 may then determine, by the processor, the superheat of the refrigeration system 105. The controller 200 may also determine a maximum superheat and a minimum superheat based on the ambient temperature and the ambient pressure. The controller 200 may then determine whether the superheat is within specified parameters (e.g., the maximum superheat and the minimum superheat). Upon determining that the superheat is not within the specified parameters, the controller 200 may signal the actuator sensor 325 to begin collecting data about the actuator 125. In some embodiments, the actuator sensor 325 is configured to detect the displacement of the actuator 125 (i.e., the actuator sensor 325 is configured as an encoder such that the controller 200 may determine if the actuator 125 is moving). In other embodiments, the actuator sensor 325 is configured to detect the electrical properties of the actuator 125 (e.g., current, voltage, power). In these embodiments, the controller 200 may determine if the actuator 125 is moving based on the electrical properties detected by the actuator sensor 325. For example, the controller 200 may receive from the actuator sensor 325, a high current spike indicating that the actuator 125 is moving. Alternatively, the controller 200 may receive, from the actuator sensor 325, a low current spike indicating that the actuator 125 is not moving. The controller may determine, based on the actuator 125 not moving, that the actuator 125 has experienced a failure (e.g., an electrical failure, a mechanical failure, etc.).

Now referring to FIGS. 6 and 7, flowcharts of a method for detecting failure of an expansion valve (e.g., expansion valve 121) and responding to the failure are shown, according to exemplary embodiments. In an exemplary embodiment, the methods shown are performed by the controller 200 and connected components shown in FIGS. 1-5. Referring specifically to FIG. 6, a method 500 for detecting a valve failure is shown according to an exemplary embodiment.

At step 510, the inlet temperature, the outlet temperature, the ambient temperature, the inlet pressure, the outlet pressure, and the ambient pressure are monitored. For example, the inlet temperature sensor 311 can measure the inlet temperature and provide the measurements to the controller. In some embodiments only one of the temperature or the pressure is monitored at each of the inlet sensors, outlet sensors, and ambient sensors. For example, step 510 may include receiving, by the controller 200, data from the inlet pressure sensor 312, the outlet pressure sensor 322, and the ambient pressure sensor 362 and storing the data in the memory device 410. It should be appreciated that other combinations of measuring temperature and pressure are possible. For example, the inlet pressure, the outlet pressure, and the ambient temperature may be measured.

At step 520, a superheat of the refrigeration system 105 is calculated based on the measured values at step 510. The superheat may be calculated using the type of refrigerant and only temperature data or pressure data stored in the memory device 410. Additionally, the superheat of the refrigeration system 105 may be determined based on at least one of the inlet temperature or the inlet pressure, at least one of the outlet temperature or the outlet pressure, and, in some embodiments, the type of refrigerant. For example, the processor 405 retrieves a first temperature value from the memory device 410 originally received by the controller 200 from the inlet temperature sensor 311 at step 510. The processor 405 may then retrieve a second temperature value from the memory device 410 originally received by the controller 200 from the outlet temperature sensor 321 at step 510. The processor 405 may then calculate the superheat of the refrigeration system 105 based on the first temperature value and the second temperature value. For example, the first temperature value may be 35° F. and the second temperature value may be 42° F. The processor 405 calculates the superheat of the refrigeration system as 7° F., or the difference between the second temperature value and the first temperature value. The processor 405 may store this value in the memory device 410. Alternatively, the processor 405 may determine the superheat by retrieving pressure values from the memory device 410 stored during step 510. The processor 405 may also retrieve a saturated temperature pressure-temperature table stored in the memory device 410. The processor 405 may determine the inlet temperature and the outlet temperature based on the table and the pressure values, and the superheat of the refrigeration system 105 thereafter. The processor 405 complete the calculation of the superheat and update the value stored in the memory device 410 at a predefined time interval (e.g., multiple times a second, ever second, every minute, etc.).

At step 525, the maximum superheat and the minimum superheat are calculated and defined by the controller 200. For example, the processor 405 may retrieve the ambient temperature or ambient pressure from the memory device 410. In some embodiments, the maximum superheat and the minimum superheat are determined by comparing the ambient temperature or the ambient pressure with tabulated values for a particular refrigerant.

Step 530 may include performing a feedback control process (e.g., a PI control process, a PID control process) to generate control signals for the actuator based on values of the superheat calculated at step 520. The feedback control process may be configured to generate control signals that drive the actual superheat value towards a setpoint. The setpoint is between the maximum and minimum values calculated at step 525. Accordingly, when the system is well-controlled, the superheat value is at approximately the setpoint value and between the maximum and minimum values. For example, the controller 200 may generate a control signal for the expansion valve 121 allowing the pressure of the refrigerant at the evaporator assembly 150 inlet to further decrease based on the superheat of the refrigeration system 105 being too low (i.e., below or near the minimum superheat value). Alternatively, the controller 200 may generate a control signal for the expansion valve 121 to decrease the pressure drop based on the superheat of the refrigeration system 105 being too high (i.e., above or near the maximum superheat value.)

Step 540 may include determining, by the processor, that the superheat of the refrigeration system 105 is between the maximum superheat and the minimum superheat. If the superheat of the refrigeration system 105 is between the maximum superheat and the minimum superheat, the controller will continue to step 550. If the superheat of the refrigeration system 105 is not between the maximum superheat and the minimum superheat, the controller 200 will continue to step 560 (i.e., this indicates a deviation from the controlled state and may correspond to a fault/error).

At step 550 the actuator 125 is identified as operating correctly by the controller. The controller may indicate that the actuator 125 is operating correctly to the user by the user interface 420 or the signaling device 425

At step 560, the controller 200 will begin monitoring the actuator 125 at step. For example, the controller may begin monitoring a current supplied to the actuator 125 measured by actuator sensor 325.

Step 570 includes determining, by the processor 405, if the current supplied to the actuator 125 is varying. In an exemplary embodiment, the actuator 125 may receive current when the actuator 125 is not moving (e.g., idling). For example, the actuator 125 may be configured as a stepper motor. In this configuration, the actuator 125 will continuously or periodically draw power to maintain positional accuracy when idle. For example, a stepper motor may draw power with a current spike at approximately 2 amps (2 A) at every period (e.g., 60 or more times a second, 5 times a second, every second, every minute, etc.). When the actuator 125 begins to move, the actuator 125 draws power with a current spike at approximately 5 A. While moving, the actuator 125 continues to draw power with the current spike at approximately 5 A (see FIG. 8).

If the controller 200 determines that the current is sufficiently varying (e.g., from 2 A to 5 A), the controller 200 continues to step 580.

In the event of a failure (e.g., an electrical failure), the actuator 125 may not draw the necessary power to begin moving. For example, the actuator 125 may continue to draw power with current spikes at 2 A if the actuator 125 has failed (see FIG. 9). If the controller 200 determines that the current is not sufficiently varying (e.g., the current spikes are not increasing from 2 A to 5 A) the controller 200 continues to step 590.

At step 580, the controller 200 determines that the actuator 125 is operating correctly. The controller may provide a signal by the user interface 420 or the signaling device 425 that the actuator 125 is operating correctly. The controller may return to step 510 or 530 to check for failures again.

At step 590, the controller 200 determines that the actuator 125 is not operating correctly. The controller 200 may signal, by the user interface 420 or the signaling device 425, that the expansion valve assembly 120 has experienced a failure. More specifically, the actuator 125 of the expansion valve assembly 120 has experienced an electrical failure. In other embodiments, the controller is configured to identify a valve failure based on a mathematical equation or lookup table. The controller may continue to method 600, return to step 510 to recheck for failures, or both.

Now referring to FIG. 7, a flowchart of a method 600 of post-failure-identification procedures is shown. In some embodiments, the method 600 may be performed as a continuation of method 500 by the controller 200 as shown. At step 610, the controller 200 signals to the devices that failure mitigation controls are enabled. At step 620, the controller signals, by the signaling device 425, an indication of valve failure. Step 620 may further include present data to the user that represents the failure mode identified by the controller 200. At step 630, the controller 200 prepares a shutdown signal for each of the system components. At step 640, the controller 200 sends a shutdown signal to the compressor assembly 160. At step 650, the controller 200 sends a shutdown signal to the fans (e.g., fan 115 and fan 155).

The controller 200 advantageously signals a valve failure and, in some embodiments, begins failure mitigation controls such that the compressor assembly 160 is not damage by a high superheat or a low superheat. For example, the compressor assembly 160 may be damaged by a low superheat if the refrigerant is received by the compressor assembly 160 in a liquid state (i.e., the refrigerant did not take on enough thermal energy to remain a vapor). In this case, the liquid refrigerant may damage the compressor assembly 160. Alternatively, the compressor assembly 160 may be damaged by a high superheat if the refrigerant is too hot when it is received by the compressor assembly 160. In this case, the refrigerant may lead to the compressor assembly 160 overheating.

In one embodiment, the failure mitigation controls may alternatively be performed by a user. For example the user may be notified, by the signaling device 425, of a valve failure. The user may then shut down the refrigeration system 105 including the compressor assembly 160, fan 115, and fan 155.

Figure 8:
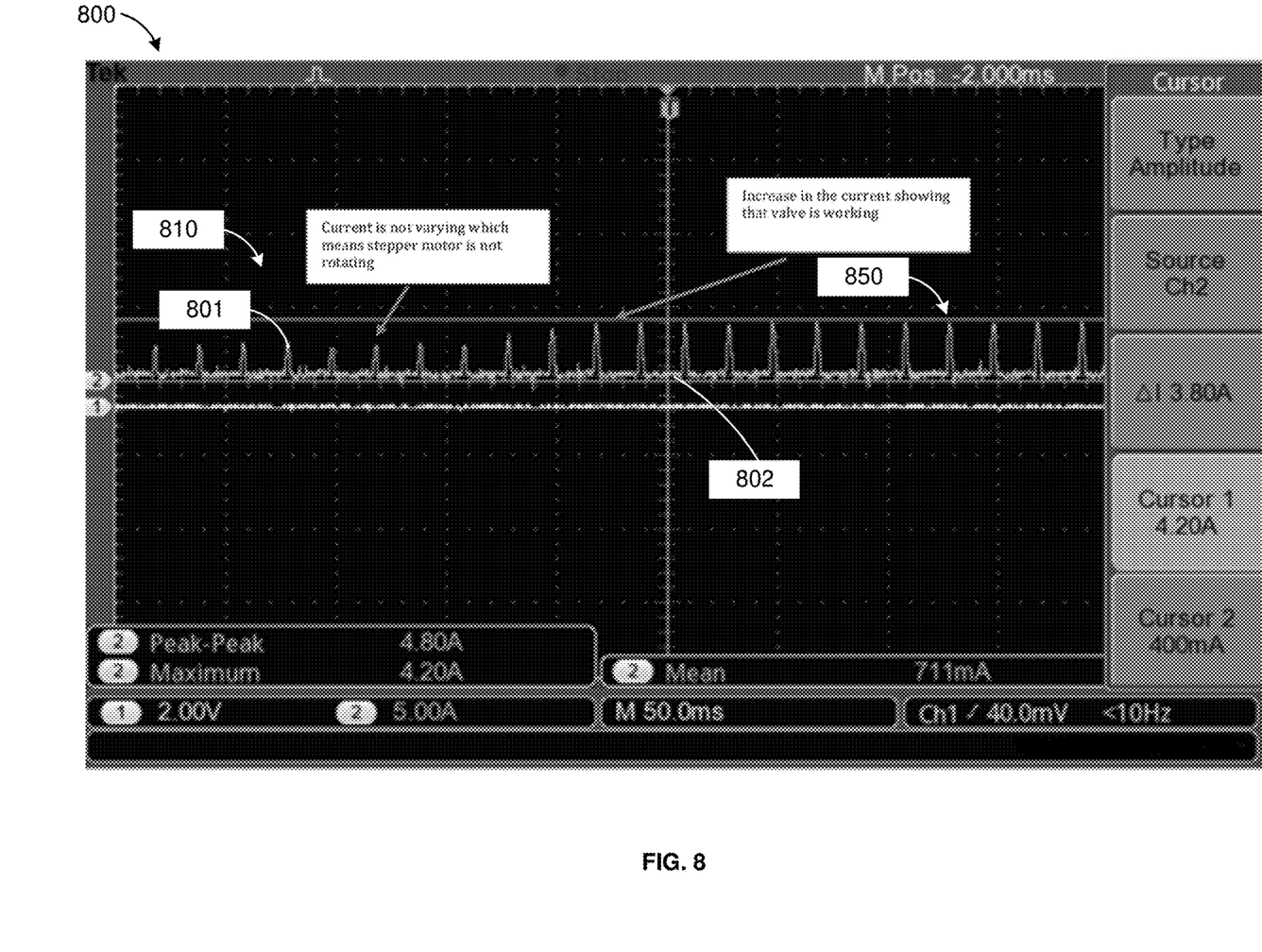
FIG. 8 is a chart of current vs time measured within the refrigeration system of FIG. 2, according to an exemplary embodiment.
Figure 9:
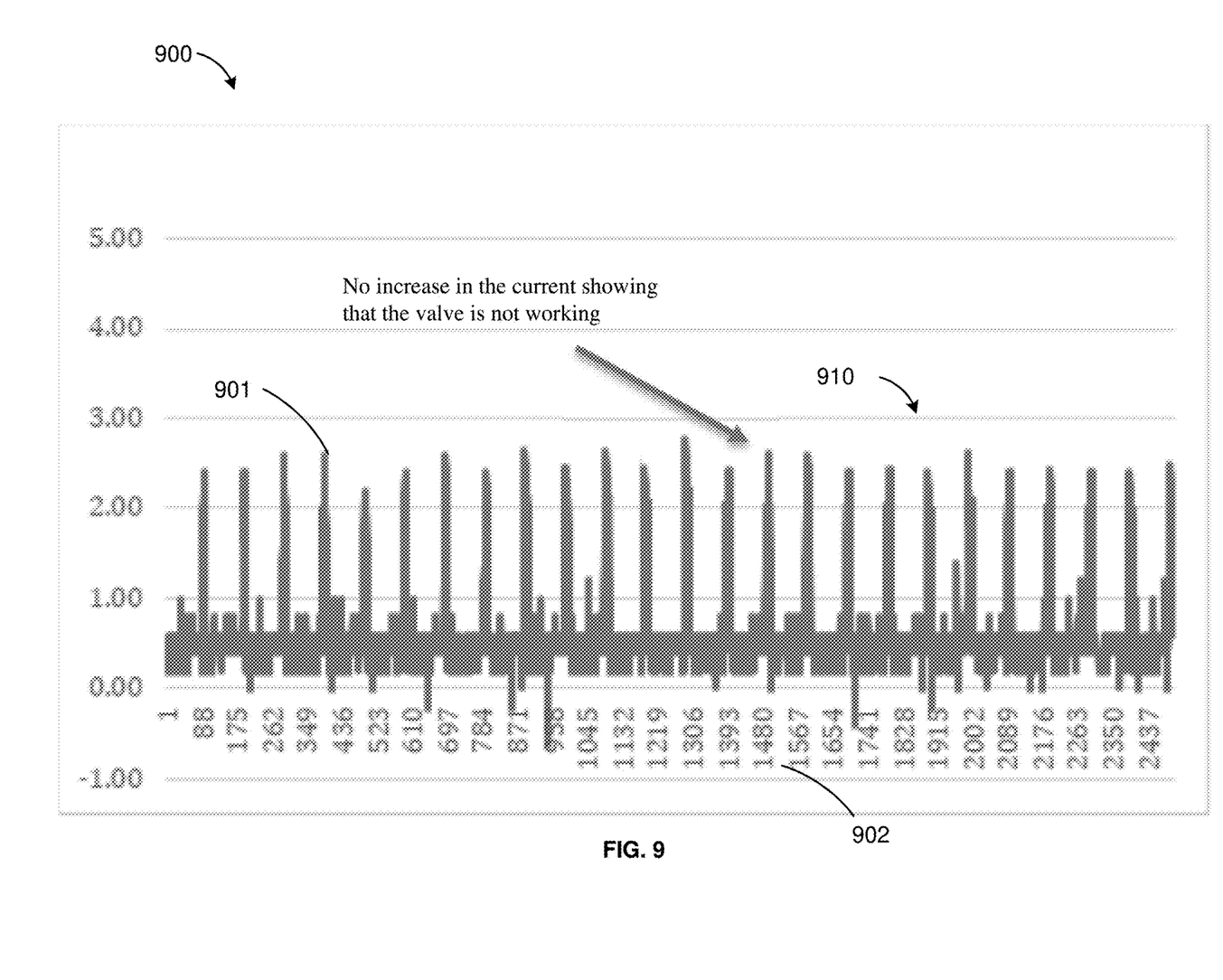
FIG. 9 is a chart of current vs time measured within the refrigeration system of FIG. 2, according to an exemplary embodiment.

Now referring to FIGS. 8 and 9, a graph of current vs time supplied to the actuator 125 is shown, according to exemplary embodiments. Referring specifically to FIG. 8, a graph 800 of current 801 (Amps) vs time 802 (milliseconds) is shown. The graph shows a first region 810 in which the current 801 spikes up to about 2 A and a second region 850 in which the current 801 spikes up to about 5 A. The first region 810 is indicative of the actuator 125 of FIG. 3 idling. The current 801 increase over the time 802 (e.g., the transition from the first region 810 to the second region 850) indicates that the actuator 125 is beginning to move. Due to the increase in the current 801 between the first region 810 and the second region 820, the controller 200 may determine that the expansion valve assembly 120 is properly functioning.

Referring now to FIG. 9 a graph 900 of current 901 (Amps) vs time 902 (milliseconds) is shown. The graph shows a region 910 where the current 901 spikes to about 2 A. The current 901 maximum, constant at 2 A, is indicative of the actuator 125 idling over the entire duration of the graph 900 (e.g., between the minimum and maximum values of time 902). Due to the constant spikes in the current 901, the controller 200 may determine that the expansion valve assembly 120 is not functioning.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The construction and arrangement of the elements of the refrigeration system and valve diagnostic system as shown in the exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The hardware and data processing components (e.g., processing circuit 400) used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The background section is intended to provide a background or context to the invention recited in the claims. The description in the background section may include concepts that could be pursued, but are not necessarily ones that have been previously conceived or pursued. Therefore, unless otherwise indicated herein, what is described in the background section is not prior art to the description and claims and is not admitted to be prior art by inclusion in the background section.

It is important to note that the construction and arrangement of the systems and methods as shown in the various exemplary embodiments is illustrative only. Additionally, any element disclosed in one embodiment may be incorporated or utilized with any other embodiment disclosed herein. For example, the methods of the exemplary embodiment described in at least paragraph(s) [0039] may be incorporated with any of the components of the refrigeration system of the exemplary embodiment described in at least paragraph(s) [0018]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method of detecting electrical failure in a refrigeration system, the method comprising:
   determining a present superheat of the refrigeration system, where the refrigeration system comprises a normal operating range that is between a maximum superheat and a minimum superheat;
   in response to the determined present superheat of the refrigeration system being outside of the normal operating range, detecting an electrical property of an expansion valve assembly of the refrigeration system;
   determining that the expansion valve assembly has experienced an electrical failure based on at least the electrical property of the expansion valve assembly;
   in response to the determination that the expansion valve assembly has experienced the electrical failure, generating a first signal indicating that the expansion valve assembly has experienced the electrical failure; and
   providing, responsive to determining that the expansion valve assembly has experienced the electrical failure and responsive to the determined present superheat outside of the normal operating range, a second signal to a fan of the refrigeration system that is configured to cause a modification in an operation of the fan, the modification in the operation of the fan comprising causing a shut down of the fan.

2. The method of claim 1, wherein determining the present superheat comprises:
   detecting, by at least one sensor of a plurality of sensors, a coil inlet temperature of the refrigeration system, a coil inlet pressure of the refrigeration system, a coil outlet temperature of the refrigeration system, or a coil outlet pressure of the refrigeration system; and
   calculating, based on at least one of the coil inlet temperature, the coil inlet pressure, the coil outlet temperature, or the coil outlet pressure, the present superheat of the refrigeration system.

3. The method of claim 1, further comprising determining the maximum superheat and the minimum superheat for the refrigeration system by:
   detecting at least one of an ambient temperature or an ambient pressure; and
   calculating the maximum superheat and the minimum superheat for the refrigeration system based on at least one of the ambient temperature or the ambient pressure.

4. The method of claim 1, wherein the electrical property is at least one of a voltage, a current, or a power.

5. The method of claim 1, wherein determining that the expansion valve assembly has experienced the electrical failure comprises determining that the electrical property is not varying, the electrical property not varying indicating that the expansion valve assembly has experienced the electrical failure.

6. The method of claim 1, wherein the fan comprises at least one of a condenser fan configured to assist in a thermal energy loss through a condenser or an evaporator fan configured to assist in a thermal energy gain through an evaporator.

7. The method of claim 1, wherein the determined present superheat outside of the normal operating range comprises the present superheat of the refrigeration system being above the maximum superheat.

8. The method of claim 1, further comprising determining that the electrical property is varying, the electrical property varying indicating that the expansion valve assembly is operating normally.

9. The method of claim 1, wherein the determined present superheat outside of the normal operating range comprises the present superheat of the refrigeration system being below the minimum superheat.

10. A refrigeration system comprising:
    a housing defining a temperature controlled space;
    a thermal exchange system, coupled to the housing, configured to selectively control a temperature of the temperature controlled space, and comprising:
      an actuator coupled to an expansion valve assembly;
      a fan configured to transfer a thermal energy of a refrigerant; and
    a controller configured to perform operations comprising:
      controlling the actuator coupled to the expansion valve assembly of the thermal exchange system to drive a superheat of the thermal exchange system to a setpoint that is within a normal operating range of the thermal exchange system, the normal operating range between a maximum superheat and a minimum superheat;
      subsequent to controlling the expansion valve assembly to drive the superheat of the thermal exchange system to the setpoint, determining a present superheat of the thermal exchange system;
      in response to the present superheat of the thermal exchange system being outside of the normal operating range, detecting an electrical property of the expansion valve assembly of the refrigeration system;
      determining that the expansion valve assembly has experienced an electrical failure based on at least the electrical property of the expansion valve assembly;
      in response to the determination that the expansion valve assembly has experienced the electrical failure, generating a first signal indicating that the expansion valve assembly has experienced the electrical failure; and
      generating a second signal causing shut down of the fan, based on the superheat of the refrigeration system being outside of the normal operating range.

11. The refrigeration system of claim 10, wherein:
    the actuator is configured to actuate the expansion valve assembly; and the actuator is configured as a stepper motor such that the expansion valve assembly of the thermal exchange system is selectively movable by the stepper motor to a plurality of positions.

12. The refrigeration system of claim 10, wherein the electrical property is at least one of a voltage, a current, or a power.

13. The refrigeration system of claim 10, further comprising a plurality of sensors coupled to the controller, the refrigerant configured to facilitate thermal energy exchange, the thermal exchange system further comprising:
    an evaporator configured to change the temperature of the refrigerant and couple to at least one of the plurality of sensors; and
    a compressor configured to increase a pressure of the refrigerant and fluidly couple to the evaporator and actuate the actuator such that the expansion valve assembly changes the pressure of the refrigerant.

14. The refrigeration system of claim 13, wherein the controller is configured to perform operations comprising:
    detecting, through at least one sensor of the plurality of sensors, at least one of a coil inlet temperature of the refrigerant, a coil inlet pressure of the refrigerant, a coil outlet temperature of the refrigerant, and a coil outlet pressure of the refrigerant;
    storing the coil inlet temperature, the coil inlet pressure, the coil outlet temperature, and the coil outlet pressure in a memory device; and
    calculating, based on at least one of the coil inlet temperature, the coil inlet pressure, the coil outlet temperature, or the coil outlet pressure, the present superheat of the refrigeration system.

15. The refrigeration system of claim 13, wherein the controller is configured to perform operations comprising:
    detecting, through at least one sensor of the plurality of sensors, at least one of an ambient temperature or an ambient pressure; and
    calculating the maximum superheat and the minimum superheat for the refrigeration system based on at least one of the ambient temperature or the ambient pressure.

16. The refrigeration system of claim 13, wherein the fan comprises at least one of a condenser fan configured to assist in a thermal energy loss through a condenser or an evaporator fan configured to assist in a thermal energy gain through the evaporator.

17. A controller for diagnosing a refrigeration system, the controller configured to perform operations comprising:
    controlling an expansion valve assembly of the refrigeration system to drive a superheat of the refrigeration system to a setpoint that is within a normal operating range of the refrigeration system that is between a maximum superheat and a minimum superheat for the refrigeration system;
    subsequent to controlling of the expansion valve assembly, determining a present superheat of the refrigeration system;
    detecting, responsive to the present superheat of the refrigeration system being outside of the normal operating range, an electrical property of the expansion valve assembly;
    determining that the expansion valve assembly has experienced an electrical failure based on at least the electrical property of the expansion valve assembly;
    generating, responsive to a determination that the expansion valve assembly has experienced the electrical failure, a first signal indicating that the expansion valve assembly has experienced the electrical failure; and
    generating, responsive to the determination that the expansion valve assembly has experienced the electrical failure and responsive to the determined present superheat outside of the normal operating range, a second signal to a compressor of the refrigeration system, the second signal configured to cause a modification in an operation of a fan, the modification in the operation of the fan comprising causing a shut down of the fan.

18. The controller of claim 17, wherein the operations further comprise:
    detecting at least one of a first temperature, a second temperature at a different location than the first temperature, a first pressure, a second pressure at the different location than the first pressure, an ambient temperature, an ambient pressure;
    determining the present superheat of the refrigeration system based on at least one of the first temperature, the second temperature, the first pressure, or the second pressure; and
    determining the maximum superheat and the minimum superheat based on at least one of the ambient temperature or the ambient pressure.

19. The controller of claim 17, wherein the fan comprises at least one of a condenser fan configured to assist in a thermal energy loss through a condenser or an evaporator fan configured to assist in a thermal energy gain through an evaporator.

20. The controller of claim 17, wherein the determined present superheat outside of the normal operating range comprises the superheat of the refrigeration system being above the maximum superheat.

21. The controller of claim 17, wherein the electrical property is at least one of a voltage, a current, or a power.

22. The controller of claim 17, wherein the determined present superheat outside of the normal operating range comprises the superheat of the refrigeration system being below the minimum superheat.

* * * * *